US011221416B2

(12) United States Patent
Antonov et al.

(10) Patent No.: US 11,221,416 B2
(45) Date of Patent: Jan. 11, 2022

(54) MULTI-CHANNEL MULTI-SYSTEM RADIO FREQUENCY UNIT OF A SATELLITE NAVIGATION RECEIVER

(71) Applicants: Nikolai Tcherniakovski, Minsk (BY); OBSHCHESTVO S OGRANICHENNOY OTVETSTVENNOSTYU "NTLAB-SC", Moscow (RU)

(72) Inventors: Igor Antonov, Minsk (BY); Andrei Kolotkin, Minsk (BY)

(73) Assignees: Nikolai Tcherniakovski, Minsk (BY); OBSHCHESTVO S ORGANICHENNOY OTVETSTVENNOSTYU "NTLAB-SC", Moscow (RU)

( * ) Notice: Subject to any disclaimer, the term of this patent is extended or adjusted under 35 U.S.C. 154(b) by 0 days.

(21) Appl. No.: 16/046,822

(22) Filed: Jul. 26, 2018

(65) Prior Publication Data

US 2018/0329073 A1 Nov. 15, 2018
US 2021/0270975 A9 Sep. 2, 2021

Related U.S. Application Data

(63) Continuation of application No. PCT/IB2017/050623, filed on Feb. 4, 2017.

(51) Int. Cl.
*G01S 19/33* (2010.01)
*G01S 19/36* (2010.01)

(52) U.S. Cl.
CPC .............. *G01S 19/33* (2013.01); *G01S 19/36* (2013.01)

(58) Field of Classification Search
CPC .................................. G01S 19/33; G01S 19/36
See application file for complete search history.

(56) References Cited

U.S. PATENT DOCUMENTS 7,358,896 B2 * 4/2008 Gradincic ............... G01S 19/32
342/357.72
7,956,804 B2 6/2011 Xin
(Continued)

FOREIGN PATENT DOCUMENTS

CN 202533579 U 11/2012
CN 103117767 A 5/2013
(Continued)

OTHER PUBLICATIONS

Bavaro, Michele, "Michele's GNSS blog—NT1065 review", Jan. 13, 2016, http://michelebavaro.blogspot.com/2016/01/nt1065-review.html (Year: 2016).*
(Continued)

*Primary Examiner* — Cassi J Galt
(74) *Attorney, Agent, or Firm* — Mark David Torche; Patwrite Law

(57) ABSTRACT

A multisystem radio-frequency unit of navigational satellite receivers usable for simultaneous reception of any combination of navigation satellite signals from multiple navigation systems. The unit includes four identical independently configurable reception channels, an automatic intermediate frequency filter band calibration system and two heterodyne frequency synthesizers, forming heterodyne signals for quadrature mixers of reception channels and clock signals for a correlator. Each reception channel includes a two-stage automatic gain control system. During operation, a heterodyne frequency synthesizer is capable of generating any heterodyne frequency using any reference frequency, wherein heterodyne frequency, located either symmetrically or asymmetrically between spectra of received global navigation satellite signals.

6 Claims, 3 Drawing Sheets

(56) References Cited

U.S. PATENT DOCUMENTS

| | | | |
|---|---|---|---|
| 8,184,048 B2* | 5/2012 | Yoo | G01S 19/33 342/357.23 |
| 10,228,469 B2* | 3/2019 | Tomiyama | G01S 19/33 |
| 2008/0128889 A1* | 6/2008 | Jeong | H01L 23/3121 257/691 |
| 2011/0057834 A1 | 3/2011 | Miller et al. | |
| 2016/0103225 A1 | 4/2016 | Grasso et al. | |

FOREIGN PATENT DOCUMENTS

| | | | | |
|---|---|---|---|---|
| CN | 203224629 U | 10/2013 | | |
| CN | 103684514 A | 3/2014 | | |
| RU | 116298 U1 | 5/2012 | | |
| WO | 2011/113540 A2 | 9/2011 | | |
| WO | WO-2011113540 A2 * | 9/2011 | | G01S 19/33 |

OTHER PUBLICATIONS

I.N. Karzan: The Exseptions Mistakes Method of Position Determination When Navigation Systems at the Same Time Are Used, Bulletin of the Siberian State Aerospace University named after Academician M.F. Reshetnev—http://cyberleninka.ru/article/n/metod-isklyucheniya-oshibok-opredeleniya-mestopolozheniya-priodnovremen-nom-ispolzovanii-navigatsionnyh-sistem.

* cited by examiner

MULTI-CHANNEL MULTI-SYSTEM RADIO FREQUENCY UNIT OF A SATELLITE NAVIGATION RECEIVER

CROSS REFERENCE TO RELATED APPLICATIONS

This Application claims priority from co-pending International Patent Application Ser. No. PCT/IB2017/050623, filed Feb. 4, 2017 which claims priority also from EA Patent Application No. 201600368 filed Feb. 5, 2016, the entire contents of both of which are hereby incorporated by reference.

SUMMARY OF THE INVENTION

A multisystem radio-frequency unit of navigational satellite receivers, which is used for simultaneous reception of any combination of satellite signals from multiple navigation systems. The unit includes four identical independently configurable reception channels, an automatic intermediate frequency filter band calibration system and two heterodyne frequency synthesizers, forming heterodyne signals for quadrature mixers of reception channels and clock signals for a correlator. Each reception channel includes a two-stage automatic gain control system.

During operation, a heterodyne frequency synthesizer is capable of generating any heterodyne frequency using any reference frequency, wherein heterodyne frequency, located either symmetrically or asymmetrically between spectra of received global navigation satellite signals.

DETAILED DESCRIPTION OF THE INVENTION

Figure 1:
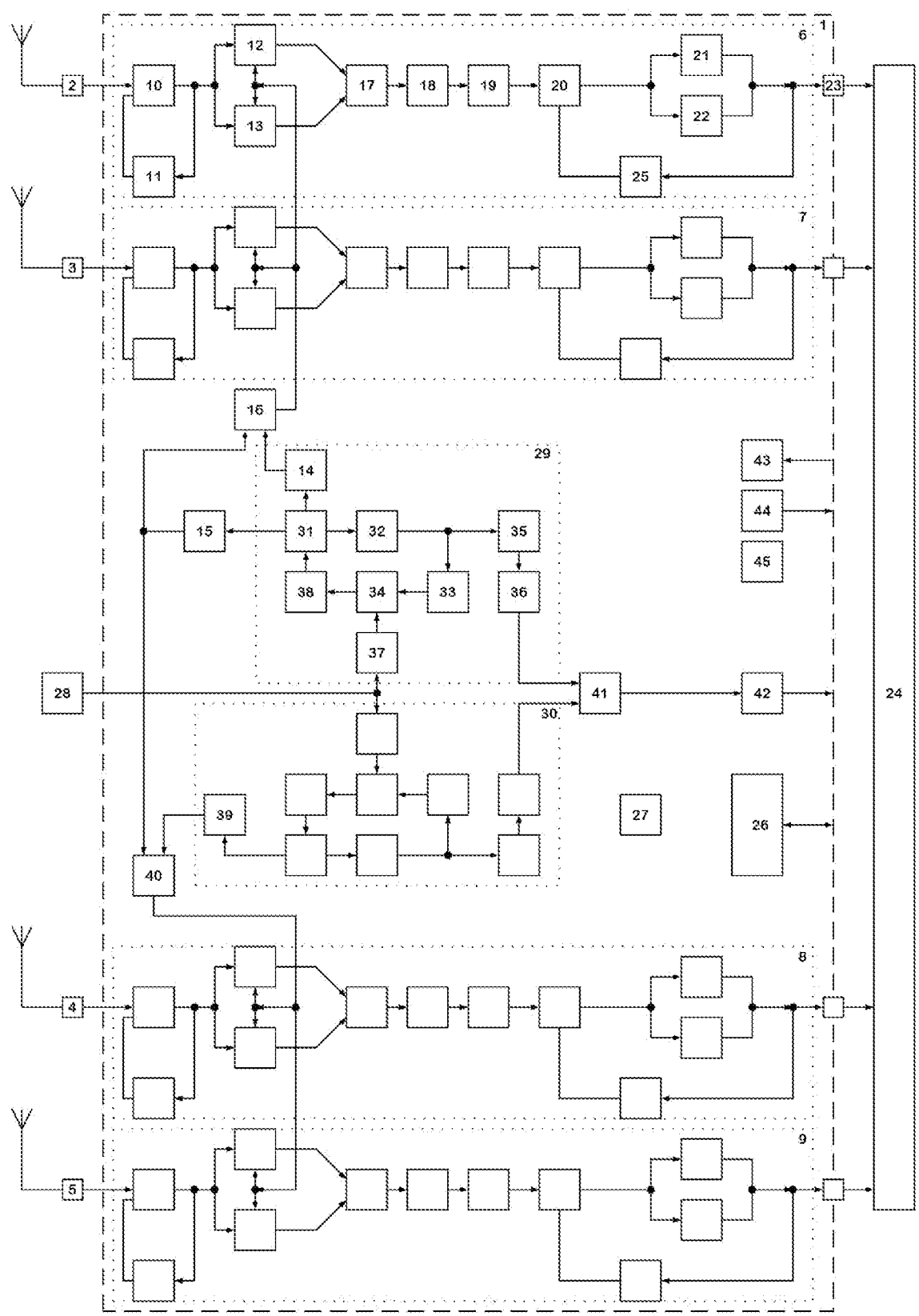
FIG. 1 is a block diagram of a multichannel multisystem radio-frequency unit of navigational satellite receiver according to an embodiment of the present invention.

The invention relates to the multisystem radio-frequency units of a navigational satellite receiver (NSR) and may be used for simultaneous reception of navigation signals from multiple navigation systems: Global Navigation Satellite System of Russia (GLONAS), US Global Positioning System (GPS), Global Navigation Satellite System of the European Union and European Space Agency (Galileo), China's Navigation Satellite System (BeiDou/COMPASS), India's Regional Navigation Satellite System (IRNSS) and Japan's Regional Navigation Satellite System (QZSS).

It is known that a simultaneous use of multiple systems by the navigator reduces the position coordinate error. In addition, "hybrid" navigators "see" simultaneously more satellites than the devices capable of operating only with one of the systems that provides a higher reception reliability [1], [2].

A multisystem navigational satellite receiver comprising a power divider, a radio-frequency channel convertor, a 10 MHz-frequency heterodyne reference signal source, a power supply unit, a signal processing module and an input-output interface module is known from the prior art [3].

A multisystem signal receiver (CN202533579U) comprising a radio-frequency unit, a radio-frequency channel convertor, a heterodyne reference signal source, a signal processing module capable of simultaneously receiving a signal from four different navigational satellite systems in a wide frequency spectrum—GPS, GLONASS, BeiDou-1 and BeiDou-2 [4] is also known from the prior art.

The disadvantage of the above signal receivers is that they are provided with a single common signal input and also that a fixed channel is provided for each of the used navigational satellite systems, thereby limiting the quantity of possible combinations of the to-be processed signals from the navigational satellite systems.

A multimode multi-frequency receiver of the navigational satellite system is known from the prior art. The device comprises a low-noise amplifier, a power divider and multiple radio-frequency signal processing circuits, including the first serially connected SHF key, multiple band filters, the second SHF key, a high-frequency low-noise amplifier, a mixer, an intermediate frequency filter, an amplifier and an automatic gain control system [5].

The disadvantage of this signal receiver is that it also comprises a single common input for signals from four channels, each of which is divided into fixed signal ranges, and that it also uses a separate synthesizer for each channel.

The claimed multichannel multisystem radio-frequency unit is configured to optimize the operation of the users' receiving devices when they are located at any point of the Earth space, increase accuracy of determining the location of receiving devices while maintaining the compactness of these devices and to reduce energy consumption of receiving devices.

A multichannel multisystem radio-frequency unit of a navigational satellite receiver comprising four independently configurable reception channels for the simultaneous reception of signals of the navigation satellite systems, including the Global Navigation Satellite System of Russia (GLONAS), US Global Positioning System (GPS), Global Navigation Satellite System of the European Union and European Space Agency (Galileo), Chinese Navigation Satellite System (BeiDou/COMPASS), Indian Regional Navigation Satellite System (IRNSS) and Quasi-Zenith Satellite System (QZSS), each channel of which comprising a low-noise amplifier the output of which is connected with the input of a quadrature mixer serially connected with an intermediate frequency filter with the tuned passband the output of which is connected to the input of the intermediate frequency gain control amplifier a signal from which is supplied to the inputs of the output line buffer and two-bit analog-to-digital converter with programmable threshold the output of which is connected with an analog-to-digital output signals detector, including the digital-to-analog converter to control the gain of the intermediate frequency amplifier comprising an automatic intermediate frequency filter band calibration system, two frequency synthesizers with phase-lock-loop frequency controls each of which comprises a voltage controlled oscillator coupled to a voltage-controlled oscillator frequency divider the signal from which is supplied to the input of two serially connected dividers to form the clock frequency of correlators and to the divider integrated into the phase lock loop connected to the input of a frequency-phase detector to the second input of which a signal from the reference frequency divider is supplied to form a comparison frequency, while the output is connected to the frequency synthesizer filter, a heterodyne quadrature signal driver for supplying the signal from the voltage-controlled oscillator and providing one common heterodyne signal for each quadrature mixer of two reception channels the multichannel multisystem radio-frequency unit further comprises a first switch, configured to transfer a heterodyne signal from a heterodyne quadrature signal driver of the first heterodyne frequency synthesizer to each quadrature mixer of two reception channels; a second switch, configured to transfer a heterodyne signal from a heterodyne quadrature signal driver of the second heterodyne frequency synthesizer to each quadrature mixer of other two reception channels; a heterodyne quadrature signal driver for supplying the signal from the voltage-controlled oscillator of the first heterodyne frequency synthesizer and providing one common heterodyne signal for each quadrature mixer of four reception channels by using a first and a second switches configured accordingly; and the multichannel multisystem radio-frequency unit further comprises a power supply module equipped with a voltage stabilizer for each functional unit, a crystal temperature sensor, a serial interface to control modes of operation of components and configuration of the entire multichannel multisystem radio-frequency unit.

Multichannel multisystem radio-frequency unit navigational satellite receiver comprises four identical independently configurable reception channels with a high degree of isolation from interpenetration of a signal and contaminating signals.

Device inputs and outputs are located symmetrically to the package corners to provide housing parasitic delays or received signals.

One of heterodyne frequency synthesizers is used as a heterodyne signal source for the first and second receiving channels while the other is used as a heterodyne signal source for the third and fourth receiving channels, with the common heterodyne signal generation mode for all four channels being available.

During operation of the claimed multichannel multisystem radio-frequency unit of the navigational satellite receiver, a heterodyne frequency synthesizer is capable of generating any heterodyne frequency using any reference frequency, wherein heterodyne frequency is located either symmetrically or asymmetrically between spectra of received global navigation satellite signals.

The reception channel 6 contains two stages of the automatic gain control system [11]. The first stage is low-noise amplifier (LNA) AGC system 11 and related to low noise amplifier 10 (FIG. 1) In each reception channel a low-noise amplifier 10 includes an automatic gain control system 11 for a first step input signal adjustment, based on monitoring of amplitude of the output voltage of the low-noise amplifier.

The second stage is intermediate frequency amplifier (IFA) AGC system with the detector 25 and related to IFA 20 for the second step input signal adjustment, based on monitoring of either digital or analog output signal of the radio-frequency unit 1.

The antenna module of the reception channel 6 (shown in FIG. 1) via input 2 is connected to an input of a low-noise amplifier (LNA) 10, equipped with an automatic gain control system (LNA AGC) 11. LNA AGC system 11 is connected to LNA 10 output and connected to second input of LNA as shown in the FIG. 1, forming a loop by monitoring the amplitude of the amplifier 10 output voltage to get a required LNA output voltage amplitude so as achieving a high received signal sensitivity.

IFA AGC system is related to intermediate-frequency amplifier 20, as follows: The output analog and digital signals of the intermediate-frequency path (IF) are detected by a detector 25 with adjustable detection level by an integrated digital-to-analog converter (not shown), programmable via a serial interface 26. The output control signal of the detector 25 arrives to the gain control input of the IFA 20 forming the AGC system of the IFA.

The AGC of the IF section may operate in the following multiple modes: line differential outputs with AGC operating on output line signals, digital outputs from an integrated two-bit two-digit analog-to-digital converter (ADC) 22 the threshold of which is set via the serial interface 26, while the signal for the detector 25 of the AGC system is supplied from the output of the IFA 20 digital outputs from an integrated two-bit ADC 22 with the signal for the detector 25 of the AGC system is supplied from the output of the ADC 22 while in digital outputs modes the detection threshold is set using an integrated DAC via the serial interface 26 so that an average filling of MAGN output signal of two-bit ADC is defined by direct or additional code set at the integrated DAC. Two-stage automatic gain control system of each reception channel 7, 8 and 9 is identical to AGC system in the reception channel 6.

A low-noise amplifier is equipped with an automatic gain control system at the input of each reception channel.

A quadrature mixer is intended for mixing amplified signal from LNA output and quadrature heterodyne signal and includes a polyphase filter (phase-shifter summator) for shifting phase of quadrature mixer output signal in wide frequency range and summing them up by selection an upper or lower stop band for suppression of an image channel.

The multichannel multisystem radio-frequency unit of the navigational satellite receiver comprises an intermediate frequency amplifier with digital-to-analog intermediate frequency gain control.

The same clock frequency, generated by any of two heterodyne frequency synthesizers, can be used for external correlator clocking and analog-to-digital converters synchronization.

FIG. 1 shows the claimed development in which a block diagram of the provided multisystem radio-frequency unit of the navigational satellite receiver made based on "system-on-chip" technology is illustrated.

FIG. 1 shows the radio-frequency unit 1 has outputs inputs 2, 3, 4 and 5 for connecting either a separate GPS/GLONASS/Galileo/BeiDou/IRNSS/QZSS antenna module to each reception channel 6, 7, 8 and 9 respectively; or a common GPS/GLONASS/Galileo/BeiDou/IRNSS/QZSS. Via an output input 2, the antenna module is connected to the input of the low-noise amplifier (LNA) 10 equipped with an LNA automatic gain control system (AGC) 11, which is connected to LNA output to monitor an amplitude of LNA output voltage and connected to second input of LNA (as shown in the FIG. 1) to send a gain correction codes to obtain a required LNA output voltage amplitude so as achieving a high received signal sensitivity. LNA output is connected to the input of the quadrature mixer, comprising mixers 12 and 13 for mixing amplified signal from low-noise amplifier output and quadrature heterodyne signal arrived from the heterodyne quadrature signal drivers 14 or 15 through switch 16, and a polyphase filter (phase shifter-summator) 17 for shifting phase of quadrature mixer output signal in wide frequency range and summing them up by selection an upper or lower stop band for suppression of an image channel. The output of the polyphase filter 17 of the quadrature mixer is connected to the input of a buffer 18, the output of which is connected to the intermediate frequency filter 19 for filtering the buffered signal from the quadrature mixer to separate a desired intermediate frequency, passband of which is tuned by an automatic intermediate frequency filter band calibration system. The output of the filter 19 is connected to the input of the intermediate frequency amplifier (IFA) 20. The output of the IFA 20 is connected to inputs of a differential analog buffer 21 and a two-bit analog-to-digital converter (ADC) 22, the outputs of which are connected to the radio-frequency unit output 23 via which analog or digital signals from navigational systems transfer to an external correlator 24. The output analog and digital signals of the intermediate-frequency section (IF) are detected by a detector 25 with adjustable detection level by an integrated digital-to-analog converter (not shown), programmable via a serial interface 26. The output control signal of the detector 25 arrives to the gain control input of the IFA 20 forming the AGC system of the IFA as a second stage of the automatic gain control system.

The logic one level may be programmed for digital outputs via the serial interface 26 and also the output voltage swing may be programmed for differential outputs.

Channels 7, 8 and 9 are identical to channel 6.

The IF filter passband is automatically tuned with an automatic intermediate frequency filter band calibration system 27, which is connected to the external reference generator 28, IF filter 19 of the reception channel 6, each IF filter of the reception channels 7, 8, 9 and serial interface 26. Automatic intermediate frequency filter band calibration system includes generator, frequency of which depends on the same elements as used in IF filter 19 and is correlated to IF filter passband. Generator frequency is compared to reference frequency from the reference generator 28, external to the radio-frequency unit, to define correction codes to be applied to IF filter 19 for specified passband. The IF filter passband is also manually tuned by setting a corresponding code via the serial interface 26 and then initiating the lock loop system automatic intermediate frequency filter band calibration system 27. Each IF filter of the reception channels 6, 7, 8 and 9 may have an individually programmed passband. In this case, upon starting the autocalibration automatic intermediate frequency filter band calibration system 27, the state machine applies correction codes according to the specified passband.

The radio-frequency unit comprises two frequency synthesizers: the first heterodyne frequency synthesizer 29 and the second heterodyne frequency synthesizer 30 with phase-locked-loop frequency controls. The frequency synthesizer 29 comprises a voltage-controlled oscillator (VCO) 31 the differential output of which is connected to the input of the heterodyne quadrature signal drivers 14 for supplying the signal from the VCO 31 and providing one common heterodyne signal for each quadrature mixer of two reception channels 6 and 7; and a VCO frequency divider 32. The output of the VCO frequency divider 32 is connected to the input of a frequency divider 33 generating the VCO divided frequency supplied to the first input of frequency-phase detector (FPD) 34 and to the input of the divider 35, serially connected to the divider 36, for dividing the signal from VCO frequency divider 32 and forming a clock signal for a correlator 24, external to the radio-frequency unit. A comparison frequency signal, formed by the reference frequency divider 37 from the external reference generator 28, is fed to the second input of the FPD 34. The output of the FPD 34 is connected to the input of the integrated heterodyne frequency synthesizer filter 38 of the frequency synthesizer 29. The output of the filter 38 is connected to the control input of the VCO 31. Division ratios of dividers 32, 33 and 37 are programmed via a serial interface 26. The band of the frequency synthesizer 29 may be tuned by controlling the filter 38 the element parameters of which are set via the serial interface 26. The VCO 31 comprises an automatic sub-band tuning system when the multichannel multisystem radio-frequency unit of the navigational satellite receiver is powered on or when a respective command is issued via the serial interface 26.

The second heterodyne frequency synthesizer 30 has the same structure as the first heterodyne frequency synthesizer 29.

There are two operating modes of transferring a heterodyne signal from heterodyne frequency synthesizers to the reception channels: (1) the heterodyne quadrature signal driver 14 of heterodyne frequency synthesizer 29 provides a one common heterodyne signal via a first switch 16 to each quadrature mixer of two reception channels 6 and 7. The heterodyne quadrature signal driver 39 of heterodyne frequency synthesizer 30 provides a one common heterodyne signal via a second switch 40 to each quadrature mixer of two reception channels 8 and 9; and (2) the heterodyne quadrature signal driver 15 supplies the signal from the voltage-controlled oscillator 31 of the first heterodyne frequency synthesizer 29 and provides one common heterodyne signal for each quadrature mixer of four reception channels 6, 7, 8 and 9 by using a first 16 and a second 40 switches configured accordingly.

Each of heterodyne frequency synthesizers 29 and 30 generate a clock signal. A multiplexer 41 is used to select a clock signal source for the correlator 24, from the first heterodyne frequency synthesizer 29 or from the second 30. The multiplexer 41 output is connected to the amplifier 42 input.

A reception channel, shown in the FIG. 1 of the radio-frequency unit 1, is based on a low IF single conversion structure. Four independent identical reception channels 6, 7, 8 and 9 of the radio-frequency unit 1 receive a global navigation satellite signal from either a common external antenna unit (not shown) or an individual external antenna unit for each reception channel via inputs 2, 3, 4 and 5. Each reception channel comprises a low-noise amplifier equipped with the automatic gain control system, a quadrature mixer with polyphase filter for image channel suppression adapted to select a stop band (higher or lower than heterodyne frequency), an intermediate frequency filter with tunable passband, an intermediate frequency gain control amplifier with the automatic gain control system, an output line buffer, a two-bit analog-to-digital converter with thresholding, an analog/digital output signals detector, a digital-to-analog converter to control the gain of the intermediate frequency amplifier via the serial interface that provides versatility of applications. To convert signals of all navigational systems, there are a one common heterodyne signal from the first heterodyne frequency synthesizer or two different heterodyne signals from the two heterodyne frequency synthesizers.

The receive path from outputs of the quadrature mixers to the IF outputs may be configured in a different manner via the serial interface that allows interference immunity to be specifically improved.

In each channel, the mixers output signals of quadrature mixer are supplied to a broad band polyphase filter (phase shifter-summator) being a part of the quadrature mixer for shifting phase of quadrature mixer output signal in wide frequency range and summing them up by selection an upper or lower stop band for suppression of an image channel. In this case, a desired signal is summed up in phase, while an image signal in relation to the desired one is in opposite phase. There is a configurable type of polyphase filter output signal, sent to IF filter: with upper sideband of heterodyne frequency or with lower sideband of heterodyne frequency spectrum. Therefore, the interference in the signal spectrum lower (upper) sideband of the heterodyne frequency is suppressed at the polyphase filter (phase shifter-summator) output. In this case, the narrowband interference does not allow to block signal reception by all systems of the multisystem RFU simultaneously, which is designed according to the claimed radio-frequency unit, therefore positioning in complicated reception conditions is improved, i.e. interference resistance of RFU is also improved.

Power supply module 43, equipped with voltage stabilizers, for functional units of each channel (HF path, IF path) and synthesizers are configured to form a stabilized voltage source and electric insulation.

In addition, the device comprises a reference current and voltage source 44 and a crystal temperature sensor 45.

Figure 2:
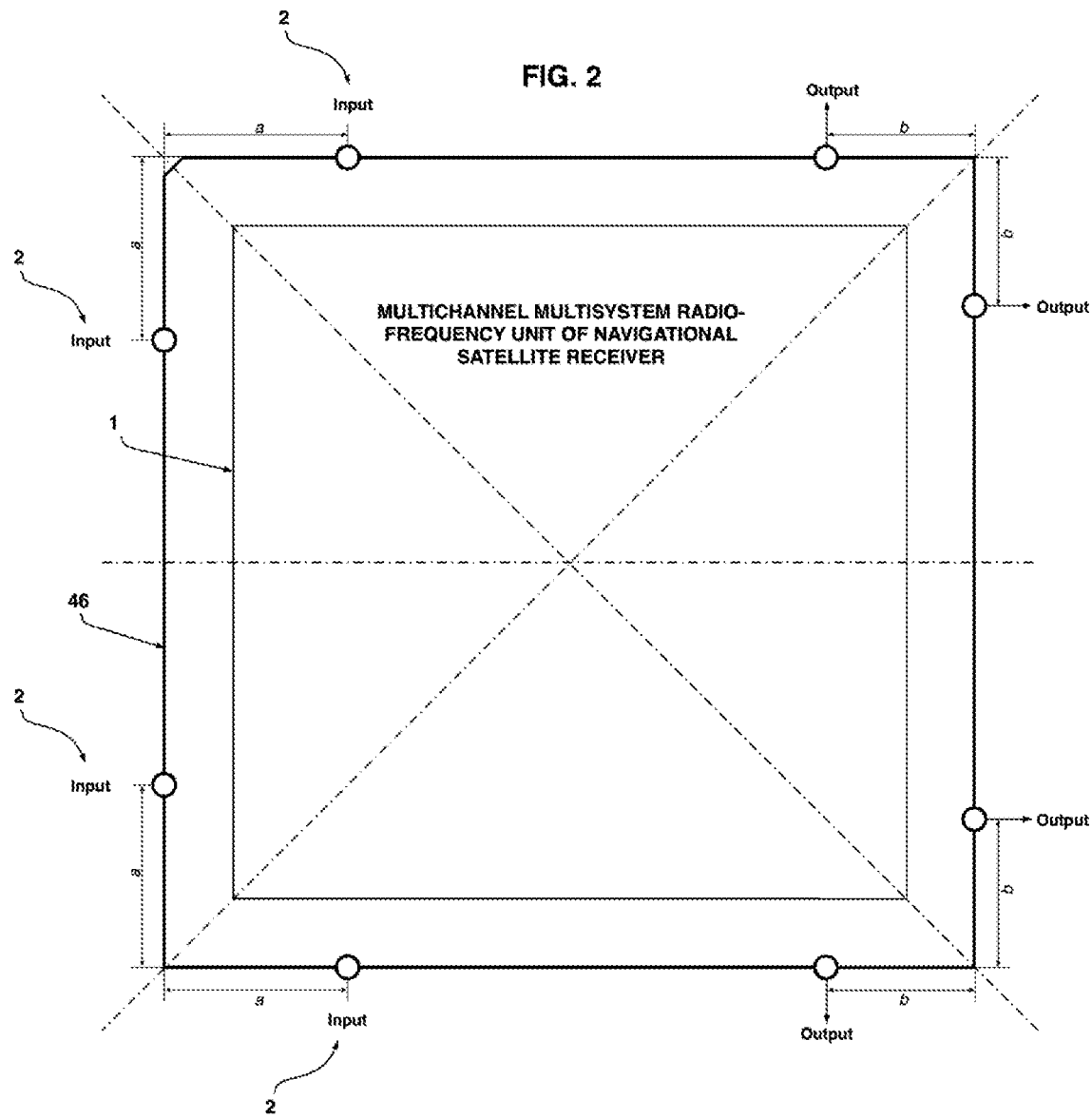
FIG. 2 is a schematic illustration of the multichannel multisystem radio-frequency unit package example with symmetrical location of inputs and outputs.

FIG. 2 shows a package 46 of the RFU 1 including inputs 2, 3, 4 and 5 for connecting an antenna module(s) to each reception channel 6, 7, 8 and 9 respectively and these inputs are located symmetrically to each other relative to the package corners, providing similarity of parasitic delays of received signals.

Figure 3:
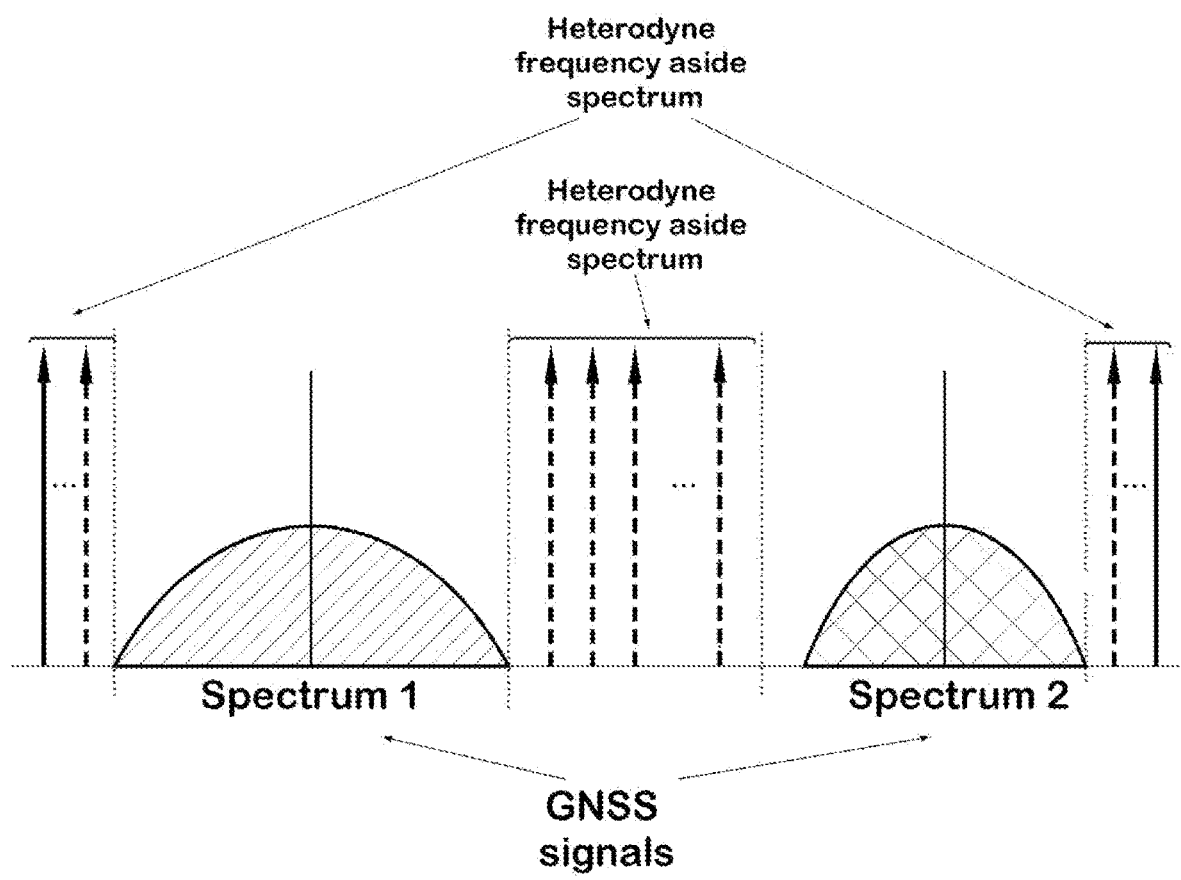
FIG. 3 is a schematic illustration showing an example of possible locations of the heterodyne frequency towards spectra of received GNSS signals.

In case a radio-frequency unit simultaneously receives different GNSS signals, spectra of which are located at different frequency spans, a heterodyne frequency synthesizer of the radio-frequency unit 1 generates a heterodyne signal using any reference frequency, located lower or upper or between received GNSS signals spectra. FIG. 3 illustrates, for example, possible locations of the heterodyne frequency.

Prototypes of the multichannel multisystem radio-frequency unit of the navigational satellite receiver designed based on the "system-on-chip" technology are made using a design documentation of "NTLab-SYSTEMS" CJSC and assembled in a QFN-type 88-pin package with a pin pitch of 0.4 mm and the following package dimensions: length—10 mm, width—10 mm, height—0.85 mm.

http://www.nis-glonass.ru/about-glonass/gps/ [1]
http://cyberleninka.ru/article/n/metod-isklyucheniya-oshibok-opredeleniya-mestopolozheniya-pri-odnovremen-nom-ispolzovanii-navigatsionnyh-sistem [2]
China Patent CN 203224629 U, priority 2 Oct. 2013 [3]
China Patent CN 202533579 U, priority 14 Nov. 2012 [4]
China Patent CN 103117767 A, priority 22 May 2013 [5],

REFERENCE SIGNS LIST 1 multichannel multisystem radio-frequency unit
2, 3, 4 and 5 inputs
6, 7, 8 and 9 reception channels
10 low-noise amplifier (LNA)
11 LNA automatic gain control system
12 and 13 mixers
a quadrature mixer
14 or 15 heterodyne quadrature signal drivers
16 first switch
a heterodyne signal
17 polyphase filter (phase-shifter summator)
18 buffer
19 intermediate frequency filter
20 intermediate frequency gain control amplifier
an intermediate frequency
21 differential analog buffer
22 two-bit analog-to-digital converter (ADC)
23 radio-frequency unit output
24 correlator, external to the radio-frequency unit
25 detector of IFA AGC system
26 serial interface
27 automatic intermediate frequency filter band calibration system
28 reference generator 28, external to the radio-frequency unit
29 first heterodyne-frequency synthesizers with phase-locked-loop frequency control
30 second heterodyne-frequency synthesizers with phase-locked-loop frequency control
31 voltage-controlled oscillator
32 voltage-controlled oscillator frequency divider
33 frequency divider
clock signal
programmable division ratio
34 frequency-phase detector (FPD)
35 divider
36 divider
37 reference frequency divide
38 heterodyne frequency synthesizer filter
39 heterodyne quadrature signal driver
40 second switch
41 multiplexer
42 output amplifier
43 power supply module
44 reference current and voltage source
45 crystal temperature sensor
46 package for radio-frequency unit

What is claimed is:

1. A multichannel multisystem radio-frequency unit of a navigational satellite receiver comprising four independently configurable reception channels for the simultaneous reception of signals of the navigation satellite systems, including the Global Navigation Satellite System of Russia (GLONASS), US Global Positioning System (GPS), Global Navigation Satellite System of the European Union and European Space Agency (Galileo), Chinese Navigation Satellite System (BeiDou/COMPASS), Indian Regional Navigation Satellite System (IRNSS) and Quasi-Zenith Satellite System (QZSS), each channel of which comprising the following functional units:

a low-noise amplifier for receiving satellite signals from the radio-frequency unit;

a quadrature mixer for mixing amplified signals from the low-noise amplifier output and a quadrature heterodyne signal;

a polyphase filter (phase-shifter summator) being a part of a quadrature mixer for shifting the phase of output signals of the quadrature mixer in a wide frequency range and summing them up by selecting an upper or lower stop band for suppression of an image channel;

a buffer for producing a buffered signal from the quadrature mixer;

an intermediate frequency filter with a tunable calibratable passband for filtering the buffered signal from the quadrature mixer to separate a desired intermediate frequency;

an intermediate frequency gain control amplifier supplied with an intermediate frequency signal from the intermediate frequency filter and the output, which is connected to both an output line buffer and a two-bit analog-to-digital converter with a programmable threshold, providing either an analog or a digital radio-frequency unit output, wherein the multichannel multisystem radio-frequency unit further comprises first and second heterodyne frequency synthesizers with phase-locked-loop frequency controls, and each heterodyne frequency synthesizer comprises:
- a voltage-controlled oscillator, generating a signal, supplied to a voltage-controlled oscillator frequency divider, the signal from which is used both for forming a heterodyne signal and for forming a clock signal for a correlator, external to the radio-frequency unit;
- a frequency divider that is integrated into a phase-locked loop with a programmable division ratio via an interface, intended for dividing a signal from the voltage controlled oscillator frequency divider and further supplying a divided signal to the first input of a frequency-phase detector, to a second input of which a signal from a reference frequency divider is supplied to form a comparison frequency, while the output of the frequency-phase detector is connected to a heterodyne frequency synthesizer filter, connected to the input of the voltage-controlled oscillator, for tuning the band of the heterodyne frequency synthesizer;
- a heterodyne quadrature signal driver for supplying the signal from the voltage-controlled oscillator and providing one common heterodyne signal for each quadrature mixer of two reception channels; two serially connected dividers, one of which has a programmable division ratio via an interface, for dividing the signal from the voltage-controlled oscillator frequency divider and forming a clock signal for a correlator, external to the radio frequency unit; and the multichannel multisystem radio-frequency unit further comprising:
- a first switch; configured to transfer a heterodyne signal from a heterodyne quadrature signal driver of the first heterodyne frequency synthesizer to each quadrature mixer of two reception channels;
- a second switch, configured to transfer a heterodyne signal from a heterodyne quadrature signal driver of the second heterodyne frequency synthesizer to each quadrature mixer of other two reception channels;
- a heterodyne quadrature signal driver for supplying the signal from the voltage-controlled oscillator of the first heterodyne frequency synthesizer and providing one common heterodyne signal for each quadrature mixer of four reception channels by using the first and the second switches configured accordingly; and the multichannel multisystem radiofrequency unit further comprising:
- a power supply module equipped with a voltage stabilizer for each functional unit, including each heterodyne frequency synthesizer,
- a reference current and voltage source,
- a crystal temperature sensor, and
- a serial interface to control modes of operation of components and configuration of the entire multichannel multisystem radio frequency unit.

2. The unit of claim 1, wherein radio-frequency unit inputs and outputs of four reception channels are located symmetrically to each other in relation to package corners to provide similarity of parasitic delays of received signals.

3. The unit of claim 1, wherein at least one of the heterodyne frequency synthesizers is capable of generating any heterodyne frequency from the tuned band using any reference frequency from the tuned band, wherein the heterodyne frequency is located either symmetrically or asymmetrically between spectra of received global navigation satellite signals.

4. The unit of claim 1, wherein in each reception channel, the low-noise amplifier further comprises an automatic gain control system for a first step input signal adjustment, based on monitoring of amplitude of the low-noise amplifier output voltage.

5. The unit of claim 1, wherein in each reception channel the intermediate frequency amplifier further comprises an automatic gain control system for a second step input signal adjustment, based on monitoring of either digital or analog output signal of the radio-frequency unit.

6. The unit of claim 1, wherein either of the two heterodyne frequency synthesizers generates a clock signal for an external correlator.

* * * * *